United States Patent
Maus et al.

(10) Patent No.: US 10,089,091 B2
(45) Date of Patent: Oct. 2, 2018

(54) SYSTEMS AND METHODS FOR USE IN DEPLOYING APPLICATIONS IN DIFFERENT REGIONS

(71) Applicant: MASTERCARD INTERNATIONAL INCORPORATED, Purchase, NY (US)

(72) Inventors: James Maus, St. Charles, MO (US); Bejoy Mathew, Dardenne Prairie, MO (US); Vijayanath K. Bhuvanagiri, Wildwood, MO (US); Arvind Jangi, O'Fallon, MO (US); Gary VonderHaar, Wildwood, MO (US); Navjot Singh Sidhu, White Plains, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 76 days.

(21) Appl. No.: 14/870,388

(22) Filed: Sep. 30, 2015

(65) Prior Publication Data

US 2017/0090894 A1 Mar. 30, 2017

(51) Int. Cl.
*G06F 9/445* (2018.01)
*G06F 8/60* (2018.01)

(52) U.S. Cl.
CPC ............ *G06F 8/60* (2013.01); *G06F 9/44505* (2013.01)

(58) Field of Classification Search
CPC .............................. G06F 8/60; G06F 9/44505
USPC .......................................................... 717/177
See application file for complete search history.

(56) References Cited

U.S. PATENT DOCUMENTS

| 2013/0013410 A1* | 1/2013 | Hoyle | G06F 8/60 |
| | | | 705/14.54 |
| 2015/0222723 A1* | 8/2015 | Adapalli | H04L 67/2809 |
| | | | 705/26.41 |

* cited by examiner

*Primary Examiner* — Wei Zhen
*Assistant Examiner* — Mohammed Huda
(74) *Attorney, Agent, or Firm* — Harness, Dickey & Pierce, P.L.C.

(57) ABSTRACT

Systems and methods are provided for use in deploying an application to one or more different regions. One exemplary method includes selecting, at a deployment device, a stack defining the application. The stack includes metadata and incorporates at least one user interface and at least one application programming interface (API). The exemplary method further includes adapting, by the deployment device, the selected stack to a region based on the metadata and the region; and deploying the application to be accessible to at least a consumer in said region.

20 Claims, 5 Drawing Sheets

SYSTEMS AND METHODS FOR USE IN DEPLOYING APPLICATIONS IN DIFFERENT REGIONS

FIELD

The present disclosure generally relates to systems and methods for use in deploying applications in different regions, with the applications being adapted to the regions automatically.

BACKGROUND

This section provides background information related to the present disclosure which is not necessarily prior art.

In a global marketplace, businesses are segregated in different geographic regions around the globe, in different business units, which may form separate subsidiaries or even separate corporations. Generally, the business units respond to consumer needs and/or desires, through the development of new products and/or new features for existing products. The resulting new products and features are often region specific, and independent, as the needs and/or desires for the new products and features may, in certain instances, be region specific.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

As the development of products, and in particular, web-based applications, takes place, independently, across multiple regions, particular aspects of the development may be redundant of efforts performed in other regions. In addition, the resulting products, while generally the same, may be desperate in functionality, as well as appearance, to the consumer. The systems and methods herein provide an environment for common development of products, i.e., software products defined by one or more stacks, which may be deployed in a number of different regions, and in regions different than the region of development. A canvas, at a deployment device, identifies a region, or regions, of deployment (e.g., by a location of the device, or by indication from the user, etc.), and automatically adapts one or more aspects of the stacks for the particular region(s) when the stacks are dropped into the canvas. In this manner, the common development of the stacks may replace desperate development in different regions, thereby providing consistency among the resulting products and providing products with the same or similar functionality, as well as a common appearance, across multiple regions.

Figure 1:
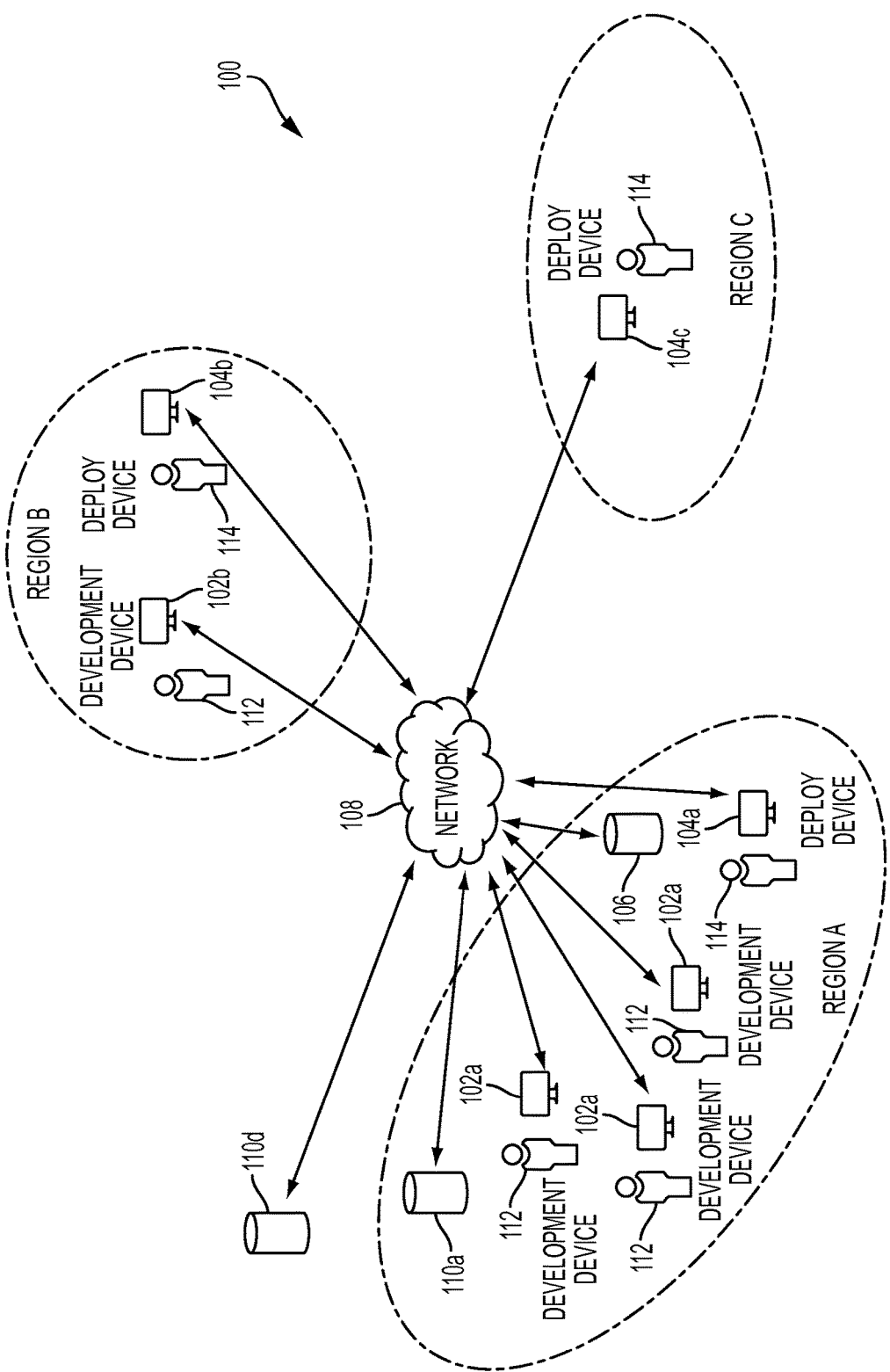
FIG. 1 shows an exemplary system that can be used to deploy applications in different regions.

FIG. 1 illustrates an exemplary system 100, in which the one or more aspects of the present disclosure may be implemented. Although parts of the system 100 are presented in one arrangement, other embodiments may include the same or different parts arranged otherwise, depending, for example, on manners of the types and/or features of applications, the payment network(s) in a region to which the application is to be deployed, a region in which a component is present, the region (or number of regions) in which applications may be deployed, etc.

The system 100 is suited for use in the development and/or deployment of software applications (broadly, products), which may be implemented as standalone applications (e.g., in a smartphone, etc.), or may form and/or be integrated with or into one or more websites, etc. The applications, in the exemplary system 100, are generally directed to financial transactions, to applying for payment accounts, to service related financial information, etc. In other embodiments, it should be appreciated that the applications (developed and deployed, as described herein) may be related to, or operate upon, any different type of information.

The development of the software applications is generally accomplished at one or multiple development devices 102, by one or more developer users 112, and the software applications are generally deployed, per region(s), at one or more deployment devices 104, by one or more assembler users 114. The deployment devices 104 are often disposed at a location or within the region, in which the particular application(s) is intended to be deployed. It should be appreciated, however, that the development device 102 may be disposed or otherwise located, while still performing as described herein.

In connection with the illustrated embodiment, FIG. 1 shows three development devices 102a and one deployment device 104a located within region A, one development device 102b and one deployment device 104b located in region B, and one deployment device 104c located in region C. It should be appreciated that development devices and/or deployment devices may be located other than as illustrated in FIG. 1, either together or separate by region. Often, however, development devices working on the same application are located together. Further, any different number of development devices 102 and/or deployment devices 104 may be included in another system embodiment, potentially depending on, for example, the number of regions, the number/distribution of developer users 112, the number/distribution of assembler users 114, the simplicity or complexity of the applications (to be developed and/or to be deployed), the degrees of customization for particular regions, etc.

In the exemplary system 100, when an application, or components thereof, (and incorporated into stacks) are developed, they are stored in repository database 106, which is accessible to the deployment devices 104 in regions A, B, and C. The repository database 106 is, broadly, a library or listing of user interfaces, application programming interfaces (API's), and/or stacks, as described below, which may be deployed.

The development devices 102, the deployment devices 104, and the repository database 106 are coupled to (and in communication with) network 108. The network 108 may include, without limitation, a wired and/or wireless network, one or more local area network (LAN), an intranet, a wide area network (WAN) (e.g., the Internet, etc.), other networks as described herein, and/or other public and/or private networks capable of supporting communication among two or more of the illustrated parts, or any combination thereof. In other embodiments, deployment devices may be coupled to (and in communication with) a repository database, with development devices coupled (and in communication) through a separate network, which allows the development devices access to the repository database, but not the deployment devices, and vice-versa.

Applications developed via the system 100 may be web-based (but this is not necessarily required), whereby data aspects and/or operation is based on network interactions, by the application, with one or more databases (existing in one or more data centers), such as, for example, databases (or, broadly, data centers) 110, via network 108. The databases 110 may include, for example, transaction data, payment account information, clearing and settlement records, promotional materials/offers, available payment account products, security content, etc. Generally, the databases 110 may contain any different type of information, which may enable the applications to perform as intended. Further the data centers 110 may host one or more implemented API, for use as described herein.

In the illustrated embodiment, the database 110a, for example, is located within region A, which is common to repository database 106. More specifically, the database 110a and repository database 106 may be at the same location. Alternatively, the database 110a and repository database 106 may be geographically separate from each other, but within the same region A. In another example, the databases 110 are separated geographically into different regions, as indicated in FIG. 1 by database 110a located in region A and database 110d being located outside of designated regions A, B, and C. It should be appreciated that databases may be provided per region, or per group of regions, etc. In the illustrated embodiment, the database 110d is associated with at least regions B and C. The databases 110a and 110d each may be broadly referred to as a data center. In one example, the database 110a is redundant of database 110d, i.e., database 110d is a backup database for database 110A, for at least certain services.

In this exemplary embodiment, the development devices 102 are associated with one or more developer users 112 to develop applications, which may be implemented in a variety of different manners, including, for example, as web-based applications, or non-web-based applications, etc. In the exemplary embodiment, the development devices 102, and developer users 112, are provided to develop applications related to settlement, bill pay, ATM locations, applying for payment accounts, payment account finders, payment account controls, promotional interfaces, etc. (broadly, applications related to payment network services). In other embodiments, the applications developed, at development devices 102, may be related to one or more other subject matters, which are unrelated to payment networks or financial information services.

The development of one or more applications involves the development of stacks in a manner, whereby the stacks are suited to deploy applications in at least two different regions. The stacks are, generally, representations of applications, to an extent, before deployment in a particular region or regions. The stacks incorporate by reference, or include different components of applications (e.g., API's, user interfaces, etc.), as described below. As defined in the stacks, the applications are not specific to any region, but are, instead, region generic (to at least two or more regions).

In one example, when an application provides marketing experiences relating to a particular region, for example, special offers, etc. (e.g., Priceless® from MasterCard®, etc.), the offers, and specifically terms and conditions for use of the offers, may be different depending on the region in which they are viewed/accessed. In some regions, to provide the marketing experience, the application may be limited in the type of personal identifying information collected from consumers and the ability to subsequently use the information regarding the offers or otherwise. While in other regions, such limitations may be omitted and/or may be different. For example, one region may require different content for privacy policies in the marketing experiences to account for different restrictions based on applicable company policies and/or governmental regulations, etc. Then, in some countries of the region, for example, personal identifying information may be restricted to on soil, and location tracking functionally may be subject to strict privacy policies, limiting the use of the tracking functionality in time, region, granularity, etc. Conversely, in other countries of the region, privacy policies relating to personal identifying information may be less restrictive. Further, the application is developed, as a stack, with the options for multiple regions (e.g., differing privacy policies and/or restrictions for particular regions, etc.), which are selectable as described below at deployment of the stack as an application. The applications are developed with all content and/or options, such that region-specific content and/or options are selectable at deployment for the desired region. It should be appreciated that a variety of region specific information options, content and/or data may be a part of the application and/or stack developed, at development devices 102, such that the application and/or stack are configurable depending on region of deployment, as described below, etc.

Applications, in various embodiments, include two types of components: user interfaces and application programming interfaces (API's). The user interface components generally dictate the interface displayed to the user, providing information to the user, and/or soliciting information from the user, for example, a consumer, while the API generally provides the operation of the application, including for example, accessing and/or processing data at, for example, one of databases 110 (i.e., at a data center). Each type of component may include aspects that are configurable depending on region. In the example above, the user interface for a marketing experience application may include a field for entering certain personal identifying information, when deployed in one country, but not in various other countries. Similarly, an API may point to database 110a, when deployed in region A, but point to database 110d when deployed in region C, for example.

The exemplary system 100 permits developer users 112 to develop applications, and more specifically, to combine one or more user interfaces and one or more API's into stacks (by inclusion or incorporation) to be multi-regional. As such, each application is developed to the requirements of multiple regions, rather than merely the region of origin for the application. After development, the components are incorporated into stacks, by the developer user 112, which are generally specific to certain services, i.e., service stacks. Each service stack represents an application, or part of an application, yet to be configured to a particular region or region(s).

As stacks are incorporated, at development devices 102, the stacks are stored in the repository database 106 (either including at least one of the components identified by the stack, or separate from the components incorporated therein, etc.).

Once developed, the assembler user 114 deploys the stack in a particular region(s), as an application with region-specific aspects set automatically, by the deployment devices 104. Because the application, and/or the underlying stack, are developed in the manner described above, and the deployment device 104 operates as described below, the assembler users 114 are able to be less skilled (as compared to the developer users 112), yet still proficient in deploying applications to consumers in one or multiple regions. In this manner, system 100 may utilize fewer developer users 112, at a common location, or coordinated locations, or remote locations, while still providing stacks suitable for multiple different regions.

Figure 2:
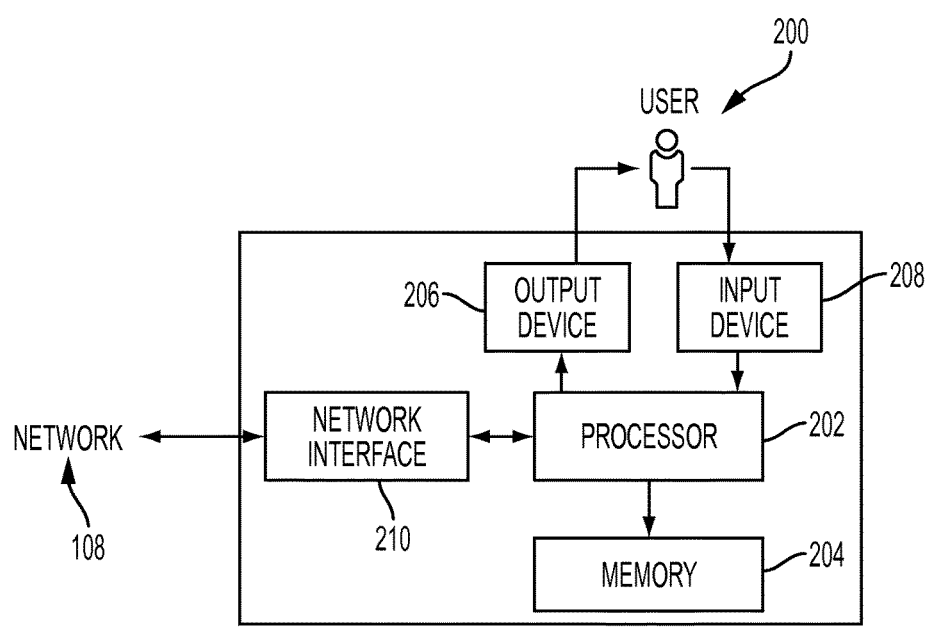
FIG. 2 is a block diagram of an exemplary computing device, suitable for use in the exemplary system of FIG. 1.

FIG. 2 illustrates an exemplary computing device 200. In the exemplary embodiment of FIG. 1, each of the development devices 102 and deployment devices 104 is consistent with computing device 200. Further, the databases 106 and 110 may, in some embodiments, be consistent with the computing device 200. Each computing device 200 may include, for example, one or more servers, workstations, desktops, laptops, tablets, smartphones, etc., as appropriate. The system 100, and its parts, however, should not be considered to be limited to the computing device 200, as described below, because it is contemplated that different computing devices and/or arrangements of computing devices may be used. Further, in various exemplary embodiments, the computing device 200 includes multiple computing devices located in close proximity, or distributed over a geographic region, so long as the computing devices are specifically configured to function as described herein.

The exemplary computing device 200 includes a processor 202 and a memory 204 that is coupled to (and in communication with) the processor 202. The processor 202 may include, without limitation, one or more processing units (e.g., in a multi-core configuration, etc.), including a central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein. The above examples are exemplary only, and thus are not intended to limit in any way the definition and/or meaning of processor.

The memory 204, as described herein, is one or more devices that enable information, such as executable instructions and/or other data, to be stored and retrieved. The memory 204 may include one or more computer-readable media, such as, without limitation, dynamic random access memory (DRAM), static random access memory (SRAM), read only memory (ROM), erasable programmable read only memory (EPROM), solid state devices, CD-ROMs, thumb drives, floppy disks, tapes, flash drives, hard disks, and/or any other type of volatile or nonvolatile physical or tangible computer-readable media. The memory 204 may be configured to store, without limitation, user interfaces, service stacks, API's, regional parameters and/or settings, default settings, etc. It should further be appreciated that the repository database 106 and/or databases 110 include memory 204, whether standalone memory disposed in a server, for example, or memory 204 which is incorporated into one of the development devices 102, the deployment devices 104 or another computing device 200 (not shown).

In various embodiments, computer-executable instructions may be stored in the memory 204 for execution by the processor 202 to cause the processor 202 to perform one or more of the functions described herein, such that the memory 204 is a physical, tangible, and non-transitory computer-readable media. It should be appreciated that the memory 204 may include a variety of different memories, each implemented in one or more of the functions or processes described herein.

The exemplary computing device 200 further includes an output device 206 that is coupled to (and in communication with) the processor 202 (however, it should be appreciated that the computing device 200 could include other output devices, etc.). The output device 206 outputs to a user (e.g., a developer, regional information services personnel, or other persons, etc.) by, for example, displaying and/or otherwise outputting information such as, but not limited to, interfaces, configuration parameters for applications, and/or any other type of data. And in some cases, the computing device 200 may cause the interfaces (as defined by a user interface component, for example) to be displayed at the output device of another computing device, including, for example, a consumer computing device, etc. Output device 206 may include, without limitation, a cathode ray tube (CRT), a liquid crystal display (LCD), a light-emitting diode (LED) display, an organic LED (OLED) display, and/or an "electronic ink" display. In some embodiments, output device 206 includes multiple devices.

The computing device 200 also includes an input device 208 that receives input from the user. The input device 208 is coupled to (and in communication with) the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both output device 206 and input device 208 in computing device 200.

In addition, the illustrated computing device 200 also includes a network interface 210 coupled to (and in communication with) the processor 202 and the memory 204. The network interface 210 may include, without limitation, a wired network adapter, a wireless network adapter, a mobile adapter, or other device capable of communicating to one or more different networks, including the network 108. In at least one example, one or more network interfaces is integrated into or with the processor 202.

Figure 3:
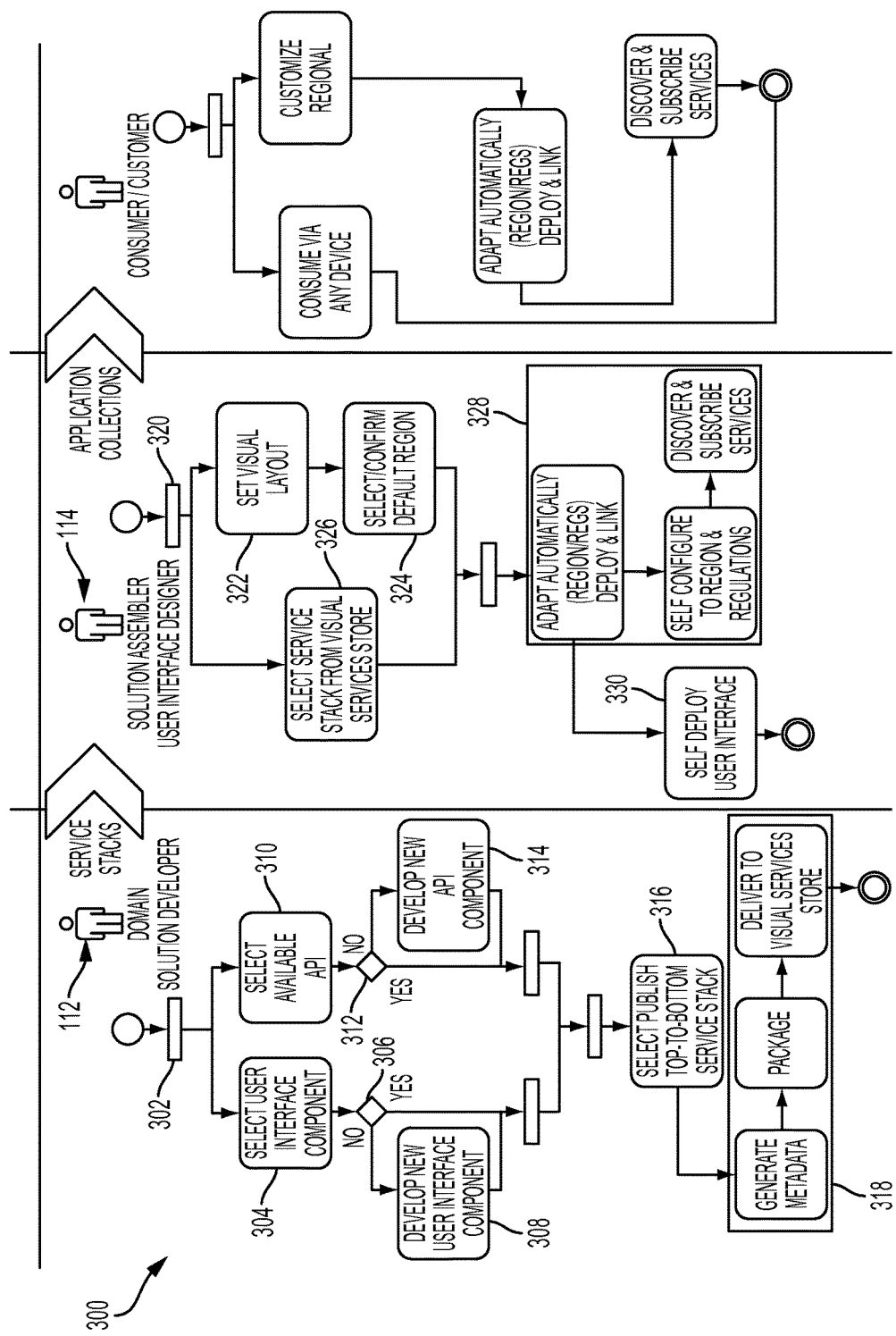
FIG. 3 is an exemplary method for use in deploying applications in different regions, which may be implemented in the exemplary system of FIG. 1.

FIG. 3 illustrates an exemplary method 300 for use in deploying one or more applications within a network. The method 300 is described with reference to the system 100, and the computing device 200. The methods described herein should not be understood to be limited to the system 100, or the computing device 200, as methods may be implemented in a variety of other systems, and/or in a variety of different computing devices. Likewise, the systems and computing devices herein should not be understood to be limited to the method 300.

The method 300 is segregated, in this exemplary embodiment, by the user involved in the performance of the method 300. However, it should be appreciated that the operations performed are not limited to the particular segregation illustrated in FIG. 3, or to the particular user described and illustrated in FIG. 3.

As shown, development aspects of the method 300 are initiated, at the development device 102, when the developer user 112 (e.g., a domain solution developer in the method 300, etc.) is assigned to provide an application for use within the system 100, at 302. Generally, in this embodiment, the application includes at least two components, an API component and a user interface component, but additional API's and/or user interface components may be included, depending on, for example, operation of the application, its complexity, and/or its use of common operations and/or user interfaces, etc. Components (of either type) may either exist, or may need to be developed. Specifically, in FIG. 3, when the user interface component is selected, at 304, the development device 102 determines, at 306, whether the user interface exists (e.g., in the repository database 106, etc.), or not. If the user interface does not exist, the developer user 112 proceeds to develop the user interface, at 308. In at least one embodiment, the developer user 112 causes a ticket to be generated at this point, which describes the user interface component, generally or in detail, and indicates development is needed. The ticket may be circulated, in this example, to a development team with one or more developer users 112 being assigned to develop the user interface component, generally, according to known methods. Once developed, the development device 102 then causes the user interface component to be stored in repository database 106.

Upon selection of the user interface at 304, the development device 102 may also display one or more API components compatible with the user interface and/or required for the particular user interface component selected.

Similarly in the method 300, or separately, at 310, the developer user 112 selects at least one API component to be included in the application. The API, which is a business domain API, in this embodiment, may be selected and/or identified, for example, based on the intended functionality of the application. At 312, the development device 102 determines whether the API exists (e.g., in the repository database 106, or data center 110, etc.), or not. If the API does not exist, the developer user 112 proceeds to develop the API, at 314. In at least one embodiment, as described above, the developer user 112 causes a ticket to be generated, which describes the API component, generally or in detail, and indicates development is needed. Once developed, for example, by one or more developer users 112, the development device 102 then causes the API component to be stored in repository database 106, or implemented in the data center 110.

Again, upon initial selection of the API at 310, the development device 102 may also display one or more user interface components compatible with the API component and/or required for the particular API component selected.

Development, in the exemplary embodiment, is based on a variety of standards and guidelines, at least some of which relate to the deployment of components in multiple different regions. For example, as described above, in some countries, personal identifying information may be restricted to on soil, and location tracking functionally may be subject to strict privacy policies, limiting the use of tracking functionality in time, region, granularity, etc. One example code segment may include the following (with further description of the code segment then provided by comments therein, which, as is known to those skilled in the art, is denoted by "//"):

```
// Personal Identifying Information (PII) stored in on soil database
(e.g., included
// in database 110, etc.) if regulated.
// Actual implementation includes data from both on soil and
central databases,
// with some data in on-soil databases and some data in central
databases for the
// same user.
if (configuration.hasOnSoilRegulation( )) storageDB = ON_SOIL_DB;
else storageDB = CENTRAL_DB
// Location Tracking is regulated by one or more policies relevant
to the user
//
// Read external configuration file for one or more policies defined
for tracking
List<TrackingPolicy>trackingPolicies = new ArrayList
<TrackingPolicy>( );
// Create Policy 2 = Region Based (e.g., Singapore vs China vs U.S).
TrackingPolicy regionBasedPolicy = new
RegionBasedPolicy(CONFIG_FILE);
trackingPolicies.add(regionBasedPolicy);
// Create Policy 3 = Granularity of location and/or regions; further
regulation of
// certain locations and/or regions
TrackingPolicy granularBasedPolicy = new
GranularBasedPolicy(CONFIG_FILE);
trackingPolicies.add(granularBasedPolicy);
// Set the tracking context based on the user's identifier or ID.
TrackingContext context = new TrackingContext( );
context.addProperty("userId", identifier);
// If tracking policy is defined in the system
// check each policy and disallow if against policy.
if(trackingPolicies !=null && trackingPolicies.size( ) > 0)
{
  for(TrackingPolicy trackingPolicy:trackingPolicies)
  {
    boolean validRequest = trackingPolicy.validate(context);
    if(validRequest == false)
    {
      throw new TrackingRequestException(
      Request is not valid, it failed Policy :"
      + trackingPolicy );
    }
  }
}
```

When each of the components of the application is available/selected, in the repository database 106, for example, the development device 102 selects to publish a stack for the application, at 316, and then publishes the stack, at 318. The stack is generally not a copy of the components used by the application, but instead, is a description or incorporation of the components. In particular, in this exemplary embodiment, publishing the service stack, by the development device 102, includes generating a description of the application and its components, which generally includes, for example, metadata. The metadata may include, without limitation, names of the components, descriptions of the components (e.g., operation and/or purpose), language, regions of use, qualities, routing information, discovery information, required links for one or more data centers, etc. Broadly, the metadata includes any information that may be usable in one or more later operations of the method 300, to enable the deployment of the application in one or more regions of the system 100.

As shown, publishing the service stack, at 318, further includes the development device 102 packaging the stack, which may include naming the service stack, and combining the user interface (UI) components, appropriate metadata and automation configuration data in the stack, etc., and delivering the stack to be stored in the repository database 106, from which it may be deployed. In various embodiments, the repository database 106 may be subject to one or more of version control, audit tracking, licensing for application, web accelerations, and/or automated removal of stacks that incorporate or call to obsolete, expired, of prior versions of components.

It should be appreciated that various additional, or alternate, processes may be employed in variations of the method 300 to generate and store stacks from which applications may be deployed into region(s), by assembler user 114, as described below. Again, the particular processes and/or involvement of the developer user 112 may be impacted by the complexity of the application, its functionality, etc.

Separately in FIG. 3, as stacks for applications are populated into the repository database 106, the applications are deployed to different regions, by the assembler user 114 (e.g., a solution assembler user interface designer, etc.), at deployment device 104. In connection therewith in the method 300, the assembler user 114 determines, at 320, to deploy an application, web-based or otherwise, for use by consumers (e.g., individuals, clients, business partners, etc.), in a particular region, or regions.

Initially, in this embodiment, the assembler user 114 sets, at the deployment device 104, a visual layout for the application, at 322. For example, the assembler user 114 may select, at the deployment device 104, the ordering of different features, functions, and/or user interfaces to be incorporated in the application. Additionally, at 322, the assembler user 114 may indicate to the deployment device 104 different content to be included in the user interface(s), including, for example, narratives about the offeror of the application, instructions, etc. For example, when a bank, limited to a particular region, is the offeror of the application, the narrative may include content about the bank's history, its presence in the region, etc. In this manner, while the application is substantially based on a region-generic service stack (defining one or more of the user interfaces and API components), the application, when deployed, is often refined to the particular region or consumer, while minimizing additional development and/or relying on region-generic components having the same appearance.

With continued reference to FIG. 3, the assembler user 114 then confirms, at the deployment device 104, the region of deployment, at 324. In this particular embodiment, the region of deployment is defaulted to the region in which the deployment device 104 is located. That is, when an assembler user 114 (and deployment device 104) is located in Mexico, the deployment device 104 defaults to Mexico as the region of deployment. Even in this embodiment, the deployment device 104 requests the assembler user 114 to confirm the region of deployment (e.g., "Please confirm the region of deployment is Mexico," etc.). The confirmation request may further include, in some embodiments, the option to select additional regions for deployment. For example, in the system 100 of FIG. 1, the deployment device 104a is located in region A, but the application may be intended to be deployed in both regions A and B. In connection therewith, the assembler user 114 is permitted to additionally select region B (along with the default region A). In various embodiments, the confirmation of the deployment region may be omitted.

Additionally, or alternatively, the deployment device 104 may not use its location as the default region of deployment. In such embodiments, operation 324 may include a request from the deployment device 104, to the assembler user 114, to identify the region or regions of deployment. The deployment device 104, in turn, receives the indication of region for deployment from the assembler user 114.

Regardless of the manner by which the deployment region is identified, the deployment device 104 sets the region or regions of deployment, for use in further operations below. The deployment device 104 may set the region or regions for deployment, per canvas (i.e., per application, etc.), or for all canvases, at the deployment device 104.

As shown in FIG. 3, the deployment device 104 further receives a selection of a stack from the repository database 106, at 326. The selection of the stack may occur in parallel with or separate from setting the visual layout, at 322, and confirming the location of deployment, at 324. It should be appreciated, however, that the order of the above steps of exemplary method 300 may be different in other embodiments. For example, the stack is often selected, at the deployment device 104, after the region of deployment is confirmed/selected, so that the mere selection of the stack (in some embodiments) may begin configuration of the stack (or application defined thereby) to the particular region (or regions).

The selection of the stack (or multiple stacks) may include simply clicking on the stack in a library of stacks in the repository database 106 (available for the region), or it may include the assembler user 114, at the deployment device 104, dragging the stack from the library and dropping the stack into the canvas.

Figure 4:
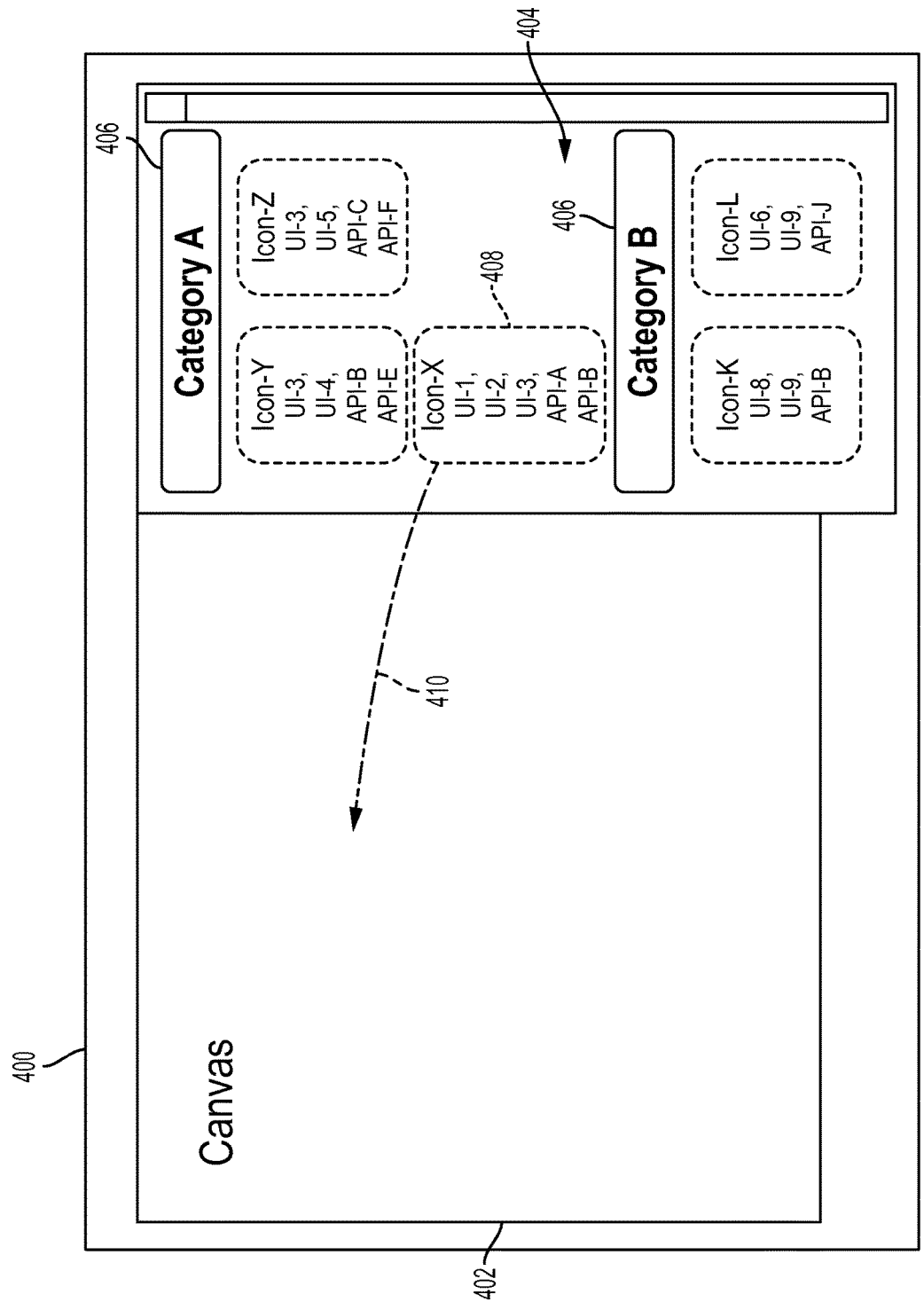
FIG. 4 is an exemplary interface for deploying a stack to a region, suitable for use in the exemplary method of FIG. 3 and/or with the exemplary system of FIG. 1.

FIG. 4, for example, illustrates an exemplary interface 400, which may be presented, at output device 206 of deployment device 104, to assembler user 114. The interface 400 includes a canvas 402, which is defaulted to the region in which the deployment device 104 (at which the interface 400 is shown) is located. The interface 400 further includes a menu 404 of stacks organized into categories 406 for ease of reference by the assembler user 114. The stacks are represented by icons 408, which may be selected by the assembler user 114 and dragged into the canvas, as indicated by dotted arrow 410. As shown, the icons are associated with multiple stacks, including those described below with reference to FIG. 4, for example. It should be appreciated that any number of different interfaces, including any number of different stacks (by represented by icon or otherwise), in one or more different formats, may be employed to permit the assembler user 114 to perform as described herein.

With reference again to FIG. 3, subsequently in the method 300, the deployment device 104 adapts, at 328, the stack (more specifically, the underlying user interface(s) and API(s)) to the region of deployment. In particular, at 328, the deployment device 104 dynamically discovers and links the services that are part of the stack, defining the application. In some embodiments, such regional adaption may be completed as part of regional deployment of the application, while in other embodiments such adaption may be completed prior to deployment.

For example, the deployment device 104 configures the application to direct data traffic to the appropriate regional or global data center. With reference to the system 100 in FIG. 1, if an API is present in region A, regardless of the location of deployment of the application, the deployment device 104c (located in region C) provides a different configuration than the deployment device 104a (located in region A). Specifically, for example, the address of the database 110a may be https://datacenter-a/db and the address of the database 110d may be https://datacenter-d/db. Further, the deployment device 104 adapts the stack to the regional and/or local policies associated with the application. Security protocols, data privacy terms, and/or compliance may be different in different regions, whereby different policies about the collection of data may implicate the operation of the application.

Further still, content of the user interface (e.g., terms and conditions, "About us" pages, etc.) will often be different and adapted, by the deployment device 104, depending on region. The deployment device 104 additionally adapts the language of the user interface to the language of the region. When multiple languages are known to be in the selected region(s), the deployment device 104 may provide the option of language or languages to the assembler user 114. The deployment device 104 may also adapt the user interface to account for the currencies of the region. In at least one embodiment, the user interface is adapted to receive information in one currency, and then communicate with an API, in another region, in a different currency. Alternatively, the user interface may interact with a consumer in a region-specific currency, and then inform the API of the currency upon data traffic therewith.

In one embodiment, in adapting the stack, the deployment device 104 further links the user interface to a backup and/or failure data center, for the particular region of deployment.

Further, upon deployment to a region, in one or more embodiments, the stack may also adapt and/or link to (although it is not required to do so), as available, one or more particular deployment devices, and/or user interface (UI) resolutions and/or capabilities, API performance and/or availability due to hosting data center or network performance, and/or links to external services (e.g., tracking, etc.) allowed/disallowed per region-specific regulatory entity or requirement, etc.

Then in the method 300, when the application is adapted to the region or region(s), the deployment device 104 deploys, at 330, the application in the region(s) for use by consumers.

With continued reference to FIG. 3, then in method 300, the consumer/customer is able to use the application, in the region in which it was deployed. In addition, as the consumer is located in a region, other than the region in which the application was deployed, the application adapts to the region in which the consumer is located, for example, based on selection of the region by the consumer when the region is not previously in use, etc.

Figure 5:
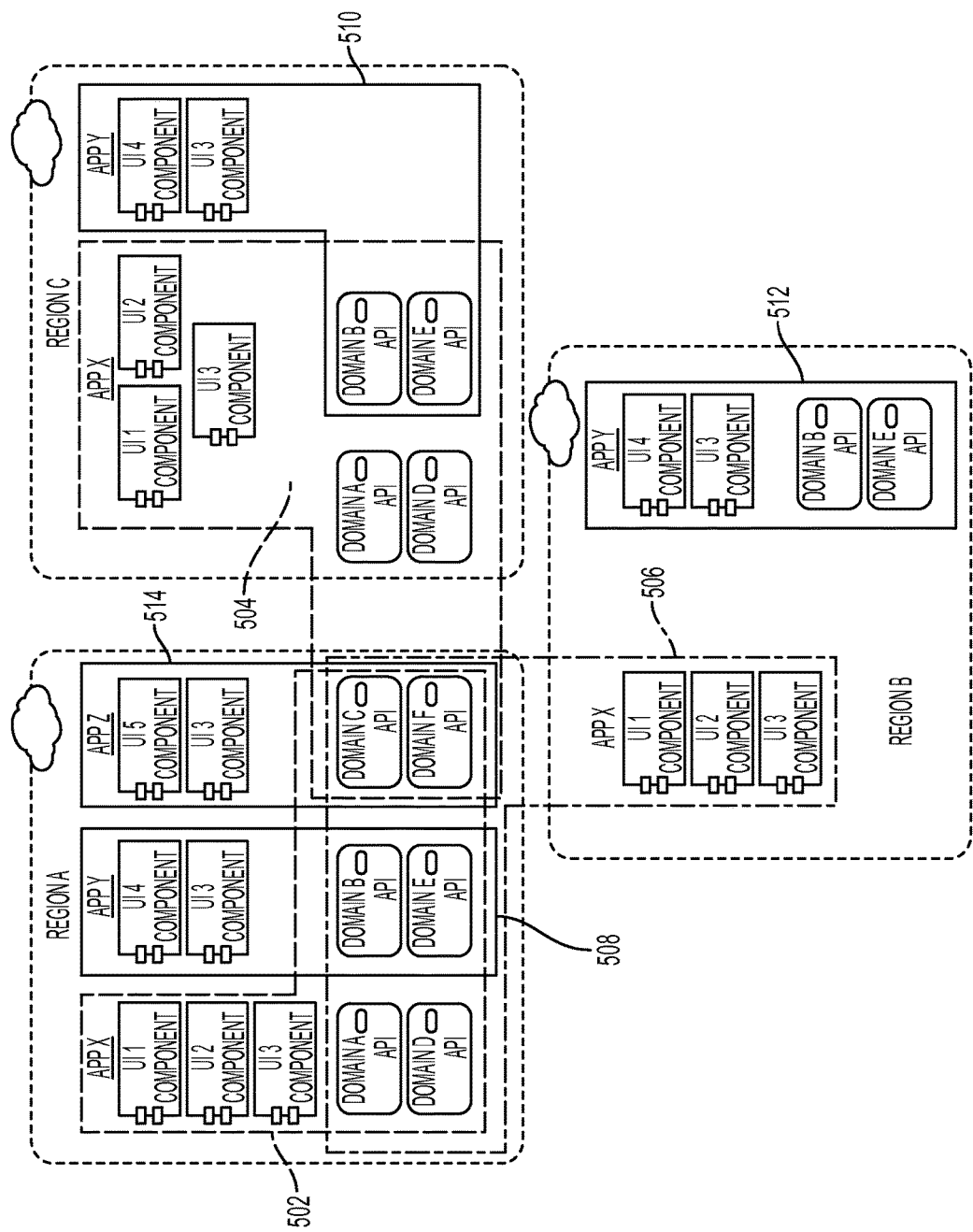
FIG. 5 illustrates a block diagram of three applications, defined by three stacks, deployed according to the exemplary method of FIG. 3 and/or in connection with the exemplary system of FIG. 1.

FIG. 5 illustrates an exemplary implementation of three applications (i.e., applications X, Y, and Z) deployed to three different regions. For ease of reference, the three regions are regions A, B, and C, which are illustrated in FIG. 1. With further reference to FIG. 5, each of the applications relies on at least one user interface, or UI component, and at least one API component. Specifically, in this example, application X relies on user interfaces UI-1, UI-2, and UI-3 and API's for Domains A, B, C, D, E, and F, as indicated by 502, 504 and 506. Similarly, application Y relies on user interfaces UI-3 and UI-4 and API's for Domain B and E, as indicated by 508, 510 and 512. And, application Z relies on user interfaces UI-3 and UI-5 and API's for Domain C and F, as indicated by 514.

As illustrated, the API's may not be present in the region in which the application is deployed. One or more API's may be hosted at a data center, or other computing device, located in a different region. In FIG. 5, the domain C API, for example, is located at a data center within region A (e.g., database 110a, etc.), but called by applications located in both regions B and C. In addition, the location of the API may be based on the data center in which it is located and/or the functionality provided thereby. For example, a data center in Missouri may be provided for bill pay operations for North America, whereby an application in Mexico may reach the data center in Missouri, by API. Conversely, for an application for applying for a payment account in Mexico, a local data center, or computing device, on which the API is present, may be located in Mexico.

Apart from the API's, while different user interface components are used in different regions (e.g., user interface UI-1, etc.), the user interface components are present and active in the deployed region of the user interface. However, because the user interface is adapted to its deployed region, per the methods described herein, the user interface is adapted to reach the same API (e.g., domain C API, etc.), wherever located.

It should be apparent from the diagram of FIG. 5 that efficiency and consistency is gained from the development of user interfaces and API's, which may be deployed regardless of region. The components, as described herein, react to the region of deployment to automatically link to the proper API's and/or databases and/or data centers as appropriate. The region of deployment may be linked to the location of the assembler users, and may be selected by the mere act of dragging and dropping the stack (i.e., descriptive of the user interface and/or API) into a canvas for that region and/or that application to be deployed. In this manner, a centralized, or decentralized, group of developer users may provide components across different regions, that may be deployed by assembler users (less skilled than developer users) without the components being redeveloped per region. In addition to efficiency, consistency and ease of revision is provided to the system.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques, including computer software, firmware, hardware or any combination or subset thereof, wherein the technical effect may be achieved by performing at least one of: (a) selecting a stack defining the application, the stack including metadata and incorporating at least one user interface and at least one application programming interface (API); (b) adapting the selected stack to a region based on the metadata and the region; (c) identifying the region as a region in which a deployment device, used in connection with selecting the stack and adapting the selected stack, is located; and (d) deploying the application to be accessible to at least one consumer in said region.

Likewise, a system and/or a computing device may include at least one processor configured to perform one or more of the methods described and/or claimed below, and include a memory in which test scripts, outputs, observations, application monitors, etc. are stored.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps, operations, etc. may be employed.

As used herein, the term "and/or" includes any and all combinations of one or more of the associated listed items.

Although the terms first, second, third, etc. may be used herein to describe various elements and operations, these elements and operations should not be limited by these terms. These terms may be only used to distinguish one element or operation from another element or operation. Terms such as "first," "second," and other numerical terms when used herein do not imply a sequence or order unless clearly indicated by the context. Thus, a first element operation could be termed a second element or operation without departing from the teachings of the exemplary embodiments.

Further, when a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in deploying payment network applications to different regions, the system comprising:
a data structure including multiple service stacks, each service stack representative of an application and incorporating at least one user interface component for the application and at least one application programming interface (API); and
a deployment device in communication with the data structure and configured, by executable instructions, to:
receive a selection of one of the multiple service stacks;
identify a region, based on a location of the deployment device, of implementation for the application;
adapt the selected service stack to the identified region, in response to the selection of the service stack, and adapt the at least one user interface component for the application to the identified region; and
deploy the application, based on the adapted service stack, to the region, whereby the application is suitable for use by a consumer in said region.

2. The system of claim 1, further comprising a data center in communication with the deployment device, via at least one network, the data center including the at least one API for said selected service stack; and
wherein the deployment device is configured, in order to adapt the selected stack, to link the at least one user interface component to the at least one API based on the identified region.

3. The system of claim 2, wherein the data center is located within said identified region.

4. The system of claim 1, wherein the deployment device is further configured to receive a selection of content from an assembler user, the content being specific to the identified region; and
wherein the deployment device is configured, in order to adapt the selected stack, to incorporate said content into the at least one user interface component for the application of the selected service stack.

5. The system of claim 1, wherein the deployment device is configured to adapt the selected stack based on metadata associated with the said selected service stack.

6. The system of claim 1, wherein the deployment device is configured to request confirmation of the identified region, based on the location of the deployment device, from an assembler user.

7. The system of claim 6, wherein the deployment device is configured to adapt the selected service stack, in response to a drag-and-drop input to a canvas associated with the identified region, by the assembler user.

8. The system of claim 1, wherein the selected service stack includes multiple user interface components for the application of the service stack and multiple APIs; and
wherein the multiple APIs include at least a first API hosted in a data center in said region and at least a second API hosted in a different data center, the different data center located in one of said region and a different region.

9. The system of claim 1, wherein the deployment device is configured, by the executable instructions, in connection with adapting the at least one user interface component for the application, to adapt language of the at least one user interface component for the application to the identified region.

10. A computer-implement method for use in deploying an application to one or more different regions, the method comprising:
selecting, at a deployment device, a stack defining the application, the stack including metadata and incorporating at least one user interface for the application and at least one application programming interface (API), the at least one API including at least one of a first API and a second API;

adapting, by the deployment device, the selected stack to a region based on the metadata and the region, wherein adapting the selected stack includes:
  linking the at least one user interface to at least the first API implemented at a first data center, when said region is a first region; and
  linking the at least one user interface to at least the second API implemented at a second data center, when said region is a second region, different from the first region; and
deploying the application to be accessible to at least one consumer in said region on which the adaptation is based.

11. The computer-implement method of claim 10, wherein selecting the stack includes receiving a user input, at the deployment device, which drags and drops the stack into a canvas associated with the application.

12. The computer-implement method of claim 10, further comprising identifying, by the deployment device, said region on which the adaptation is based as a region in which the deployment device is located.

13. The computer-implement method of claim 10, wherein the stack incorporates at least two user interfaces for the application and at least the first API and a different API; and
  wherein adapting the selected stack includes linking, based on the metadata, one of the at least two user interfaces for the application to at least the first API implemented at a first data center, when the region is a first region, and the different API.

14. The computer-implement method of claim 10, wherein adapting the stack to said region includes incorporating at least one field in the at least one user interface for the application, rather than omitting the at least one field, based on said region.

15. The computer-implement method of claim 12, wherein adapting the application to said region includes directing data traffic to a data center in the first region, when said region is the first region.

16. The computer-implement method of claim 10, wherein said region on which the adaptation is based is the first region;
  the computer-implemented method further comprising receiving a selection of the second region; and
  wherein adapting the selected stack includes adapting the selected stack to the first and second regions based on the metadata, the first region, and the second region; and
  wherein deploying the application includes deploying the application to be accessible to at least one consumer in said first region and to at least one consumer in said second region.

17. A non-transitory computer readable storage media including executable instructions for use in deploying applications to different regions, which, when executed by at least one processor, cause the at least one processor to:
  receive a drag-and-drop input of a service stack into a canvas associated with a region, the service stack defining an application, the service stack including metadata and incorporating at least one user interface for the application and at least one application programming interface (API);
  adapt the at least one user interface to include content associated with the region in response to the drag-and-drop input;
  link the at least one user interface to the at least one API, based on the metadata and the region, the at least one API being implemented in a data center associated with the region; and
  deploy the application to be accessible to a consumer in the region, via at least one website accessible in said region.

18. The non-transitory media of claim 17, wherein the executable instructions, when executed by the at least one processor, further cause the at least one processor to identify said region based on a location in which the executable instructions are executed.

19. The non-transitory media of claim 17, wherein the executable instructions, when executed by the at least one processor, cause the at least one processor, in order to adapt the at least one user interface for the application, to include a first privacy policy in the at least one user interface, but exclude a second privacy policy from the at least one user interface, based on said region.

20. The non-transitory media of claim 17, wherein the application is associated with at least one payment network service.

* * * * *